Jan. 24, 1950

H. B. CURTIS 2,495,211

STAR FINDER

Filed Nov. 14, 1947

4 Sheets-Sheet 1

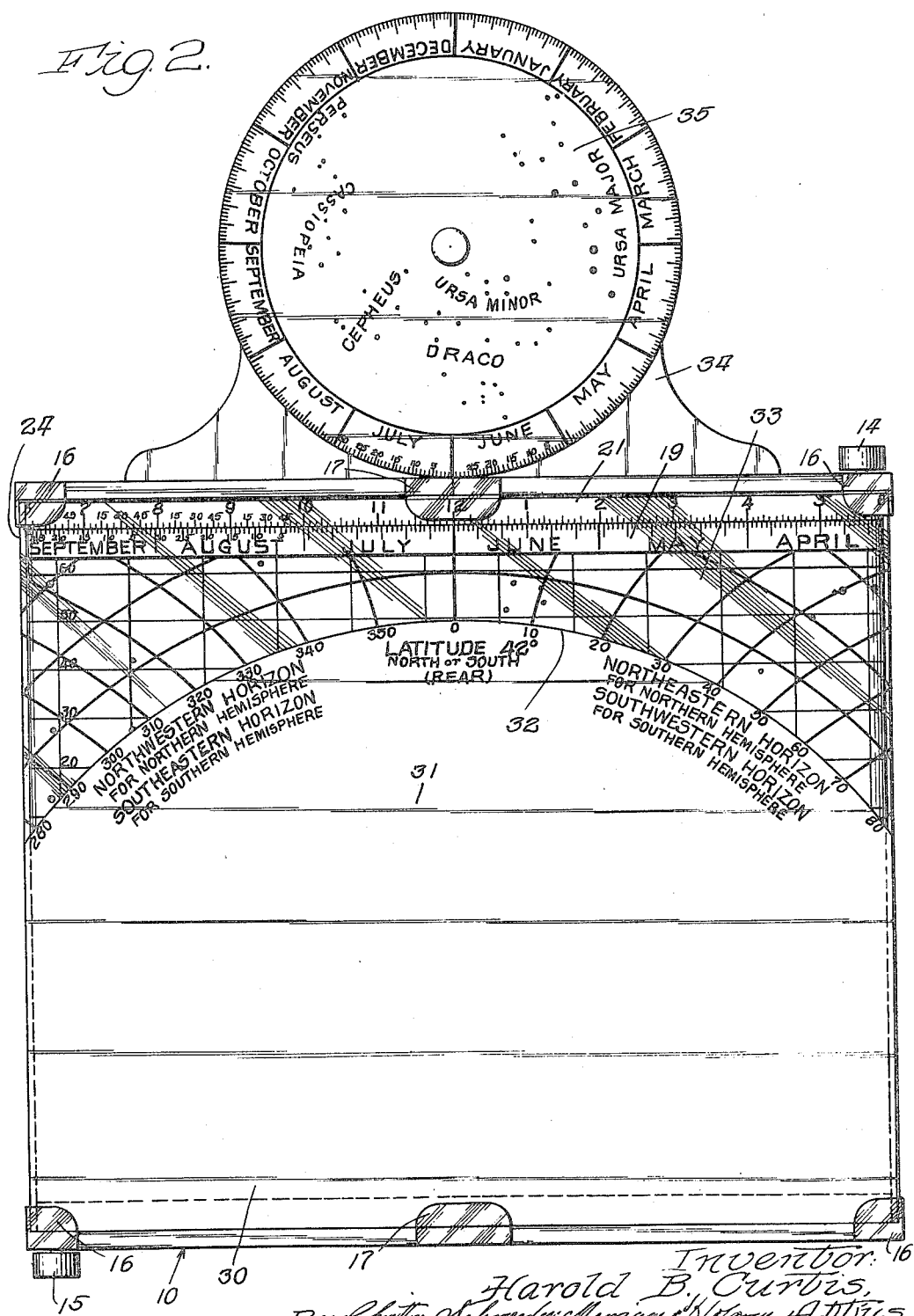

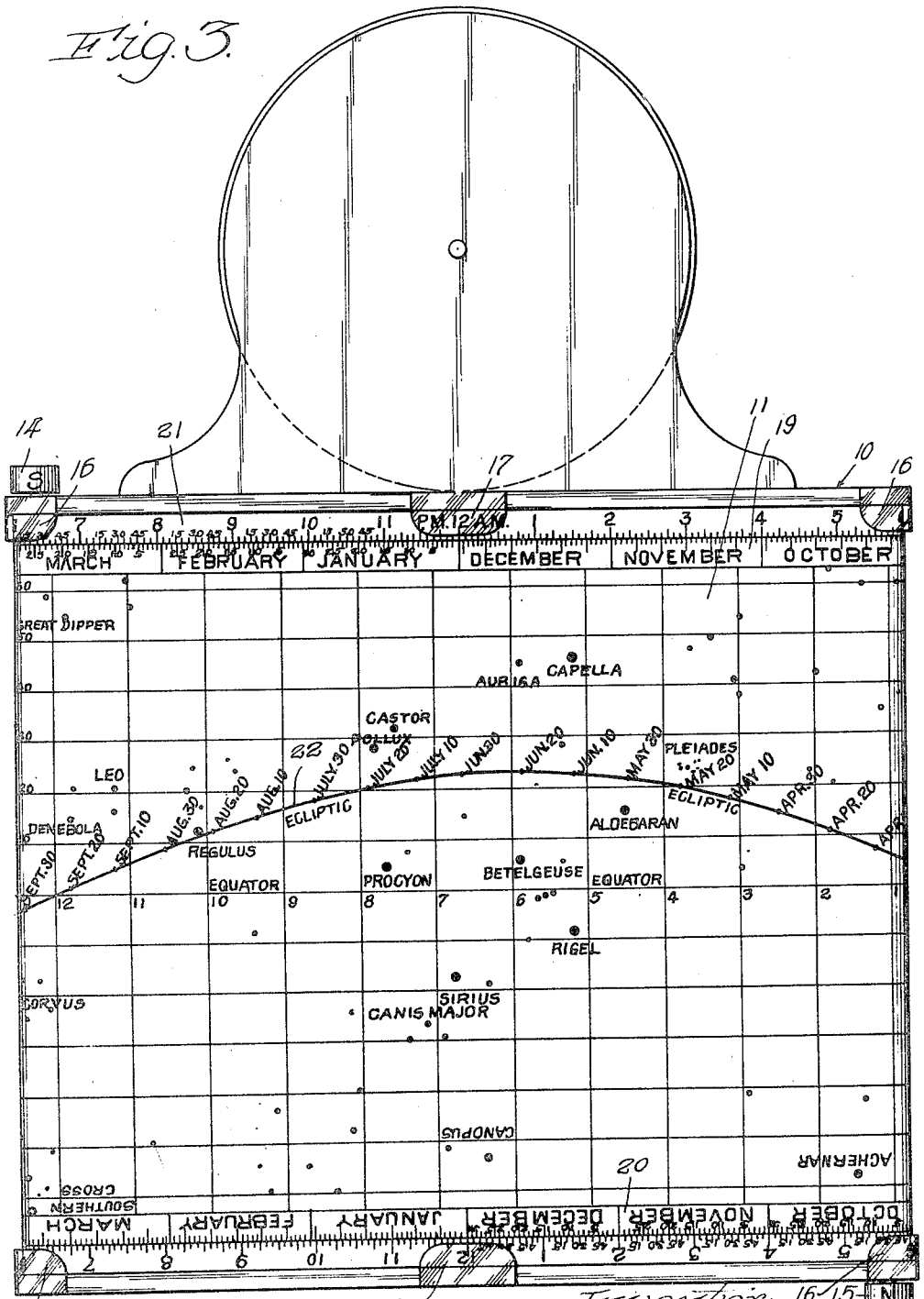

Jan. 24, 1950     H. B. CURTIS     2,495,211
STAR FINDER
Filed Nov. 14, 1947     4 Sheets-Sheet 4
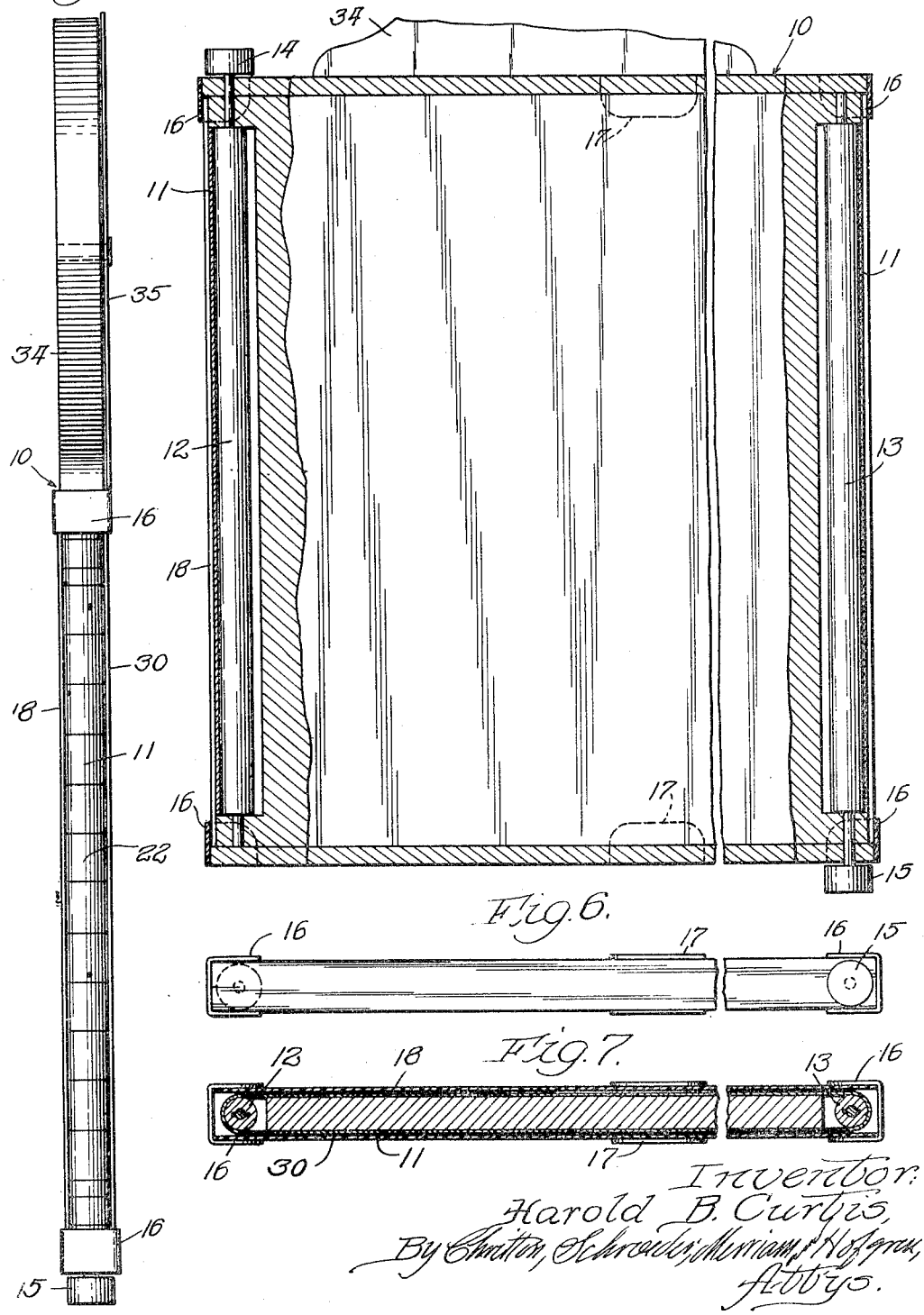

Patented Jan. 24, 1950

2,495,211

UNITED STATES PATENT OFFICE 2,495,211

STAR FINDER

Harold B. Curtis, Lake Forest, Ill.

Application November 14, 1947, Serial No. 786,061

10 Claims. (Cl. 35—44)

This invention relates to an astronomical device and more particularly to an improved star finder for locating the positions of the various celestial bodies.

The primary object of this invention is to provide a star finder to indicate the positions of celestial bodies above the visible horizon.

Another object of this invention is to provide a star finder readily adjustable for time and date to indicate the position of celestial bodies at any particular moment.

A further object of the invention is to provide a star finder having removable templates to delineate the northern and southern horizons and to indicate the altitude and azimuth of celestial bodies at any latitude of the observer.

Yet another object of the invention is to provide a star finder which is readily adjustable to time, date and latitude and which, when adjusted, indicates the altitude and azimuth of stars above the observer's horizon and also indicates the position of circumpolar stars.

Figure 1:
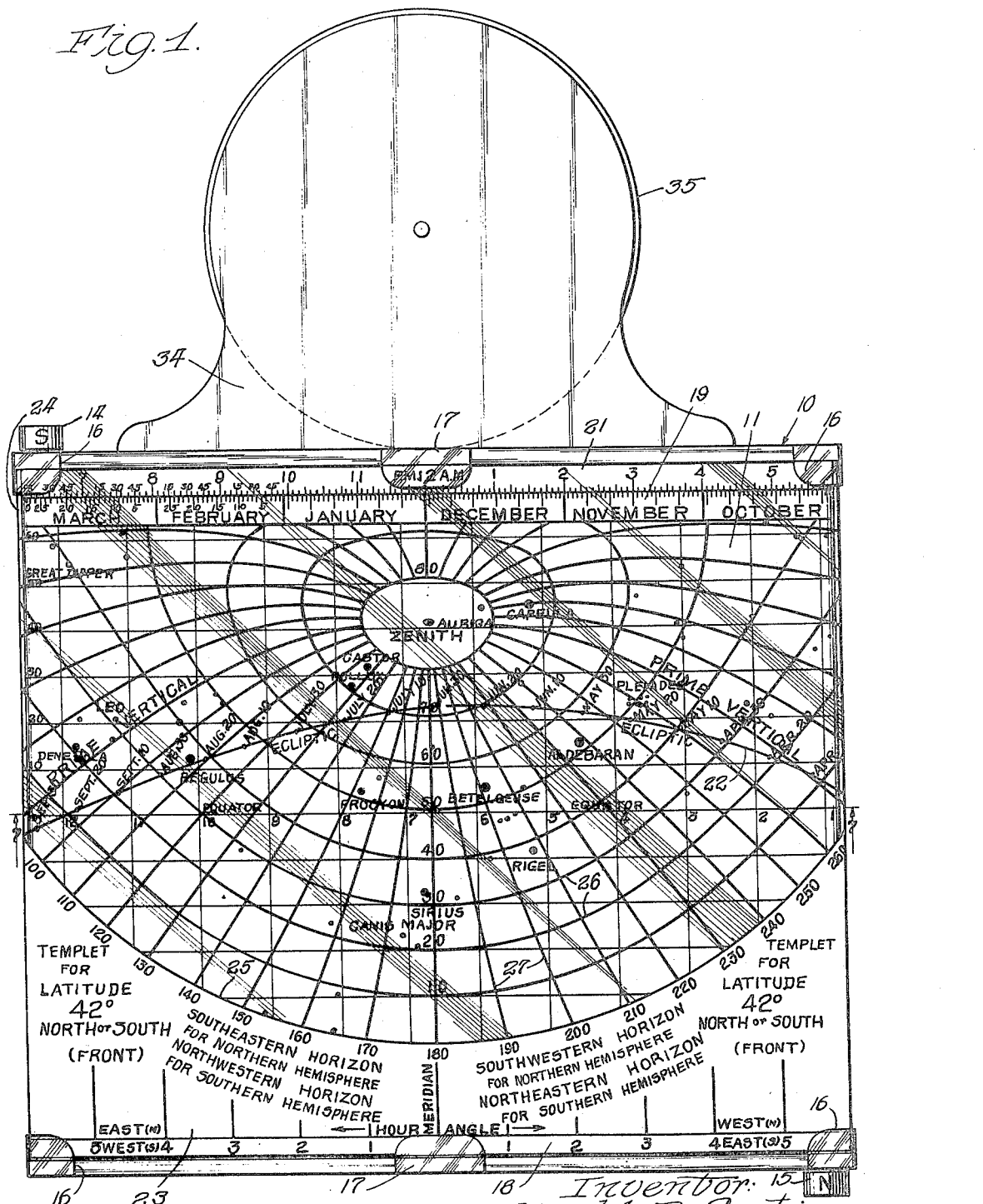
Figure 1:

The invention will be described in conjunction with the embodiment shown in the accompanying drawings in which Fig. 1 is a plan view of the front of the star finder, Fig. 2 is a plan view of the rear of the instrument. Fig. 3 is a view like Fig. 1 with the template removed. Fig. 4 is an end view of the device of Figs. 1 to 3. Fig. 5 is a section through the device showing the internal mechanism. Fig. 6 is a bottom view of the device shown in Figs. 1 to 3 and Fig. 7 is a horizontal section along line 7—7 of Fig. 1.

Referring now to the drawings, 10 indicates a holder of substantially rectangular shape carrying an endless star map 11 which is mounted upon rollers 12 and 13 at the ends of the holder. Knobs 14 and 15 are provided for rotating the rollers to move the map across the face of the holder, the knobs being lettered N and S to indicate the hemisphere in which the observer is located when using the map. The observer is expected to use the knob in the lower right hand corner of the instrument and would use the knob lettered N while in the Northern Hemisphere and would invert the holder and use the knob S in the Southern Hemisphere.

The face of the star map bears a rectangular grid, the vertical lines indicating Right ascension and the horizontal lines indicating Declination. The star map shows all principal stars from 60° north declination to 60° south declination. A date scale 19 is fixed to the top of the map as is a similar date scale 20 at the bottom. Fixed to the holder is a time scale 21 indicating the hours from 6 to 12 P. M. and from 12 to 6 A. M. The star map also carries a curved line 22 indicating the ecliptic, that is, indicating the plane of the earth's orbit and the path the sun apparently takes across the sky during the year. The various dates shown on the ecliptic indicate the position of the sun at those times.

U-shaped brackets 16 are provided at the four corners of the star finder and brackets 17 are provided at the top and bottom of the holder into which may be slipped a removable template 18.

The template 18 has an opaque arcuate portion 23 to which is affixed a transparent portion 24, both portions being insertable under the U-shaped brackets and being readily removable therefrom. The particular template shown is designed for use at latitude 42° (north or south). The arcuate line 25 indicates the horizon opposite the elevated pole. Thus, for an observer in north latitude, the line 25 indicates the southeastern, southern and southwestern horizon reading from left to right respectively. An observer in the southern hemisphere would invert the template and the holder whereupon the arcuate line 25 would indicate the northwestern, northern and northeastern horizons respectively. Inscribed upon the transparent portion 24 of the template are a first plurality of curved lines 26 more or less paralleling the horizon 25 which lines indicate the altitude of the stars appearing on that part of the map visible through the template. The lines 27 radiating from the zenith indicate the azimuth of the celestial body shown on the map, the lines terminating at the arcuate horizon 25 which bears the true bearing of the object. On the template shown, the bearings are indicated from 100° to 260° true, 180° being at the center. For use in the Southern Hemisphere a second set of azimuths should be used with 0° at the center, 280° at the left, and 080° at the right.

The back of the holder, as shown in Fig. 2, carries a second template 30 having an opaque portion 31 with an arcuate horizon 32 thereon above which is a second transparent portion 33 through which the opposite side of the star map 11 is visible. This template is designed for latitude 42° and is removable in the same manner as the template on the front of the instrument. This second template shows the northwestern, northern and northeastern horizon (to an observer in north latitude) and the stars visible therein. The date scale 19 and the time scale 21 are likewise visible at the back of the instrument but are not used to set the map to any particular date and time.

The holder is provided with a member 34 extending from the top thereof upon which is mounted a rotatable circumpolar star map 35. The circumpolar map, as its name implies, shows the stars north of 60° declination which are circumpolar stars for all latitudes north of 30°. When the star finder is used in the Southern Hemisphere a map showing the southern circumpolar stars should replace the one shown.

In using the star finder, proper templates 18 and 31 are slipped into the holder. (It is contemplated that templates will be made up for every 5° of latitude and the observer generally knows his latitude within those limits.) The date scale 19 is then matched up with the time scale 21 by rotation of the knob 15 until the proper date is opposite the local time. For example, if the date were January 15 and the time 11 P. M. the knob 15 would be rotated until the star map 11 occupied the position shown in Fig. 1. With the star finder so adjusted all of the principal celestial bodies south of the observer's zenith and their respective positions in the sky are shown. Thus, the star almost directly overhead is Capella in the constellation of Auriga. If the observer finds a bright star at an altitude of about 37° bearing almost due east of him a glance at the map indicates that that star is Regulus.

Turning the holder over, the positions of the stars in the northern horizon are indicated on the back of the star finder. To locate the position of the circumpolar stars the observer needs merely to line up the dates shown on the circumpolar star map with the date scale 19 on the back of the map. This happens to line up with July 1 for the particular date and time used (11 P. M., January 15).

The star finder may be used by the casual observer for identifying the various principal stars. If the observer has access to an almanac giving the Right ascension and declination of the planets, those celestial bodies may be plotted on the star map by using the co-ordinates. The star map will then indicate the positions of the planets. Superior planets such as Saturn and Jupiter move comparatively slowly and their positions need not be replotted frequently. The motion of Mars and Venus, however, are rather rapid and their positions on the map should be checked more frequently.

The star finder may be used in a more serious vein by navigators at sea. It is rare that a navigator knows his sky well enough to identify the stars upon which he takes his observations without the aid of a star finder. With the instrument described herein, after the navigator has observed the sextant altitude of a star he need merely to check the bearing of the star with his gyrocompass and subsequently, by setting up the star map with the date and time matched as previously described, identify the various stars "shot." For example, if the navigator observed a bright star at an altitude of 33° 16.0 minutes which had a bearing of 178 and the observation was taken at 7:30 P M., March 9 the star finder would be set to the position shown in Fig. 1. The star may be readily identified as Sirius.

The star finder may also be used as a direct means of navigation. If a shipwreck were to occur and a survivor able to get off in a life boat with the star finder and a watch, he would be able to navigate to the nearest port with little difficulty. Assuming that the accident occurred in the Northern Hemisphere, latitude may readily be determined by the altitude of the polar star which is never more than 1° from the pole. Longitude may be determined with the aid of the watch and the star finder. If the observer knows the date, which we will assume is March 1, he merely sets the star map to correspond with the stars seen at any particular time. Let us assume that with the star map set as shown in Fig. 1, that position of the sky was at 7 P. M. watch time and let us further assume that the watch time was keeping plus 4 time. The Greenwich civil time is therefore 11 P. M. and the local time (read off the time scale opposite March 1) is approximately 8 P. M. The difference between Greenwich civil time and local time is three hours and therefore the longitude of the observer is 45° west.

While I have shown and described my invention in its preferred embodiment it is to be understood that it is capable of many modifications. Changes, therefore, in the construction and arrangement may be made without departing from the spirit and scope of the invention as disclosed in the appended claims.

Having described my invention, I claim:

1. A star finder comprising a holder, a transparent template on the holder, an endless star map mounted for linear movement under the template and having approximately 12 hours of right ascension visible therethrough, altitude and azimuth indicating means associated with the template and an arcuate horizon delineator delineating the horizon opposite the elevated pole associated with the indicating means to indicate the altitude and azimuth of the star on the map.

2. The star finder of claim 1 including a linear time scale on the holder and a linear date scale on the map whereby the finder may be set to portray the sky visible at the time and date of observation.

3. A star finder comprising a holder, a transparent template on one side of the holder and endless star map under the template with approximately 12 hours of right ascension on said map being visible through the template, altitude and azimuth indicating means on the template, an arcuate horizon delineator delineating the horizon opposite the elevated pole associated with the indicating means to indicate the altitude and azimuth of a star on that portion of the map visible through the template, a second transparent template on the other side of the holder with approximately 12 hours of right ascension on said map being visible through the second template, a second altitude and azimuth indicating means on the second template, a second horizon delineator delineating the horizon under the elevated pole and associated with the second indicating means to indicate the altitude and azimuth on that portion of the map visible through the second template and means for moving the map in a linear path under the templates.

4. The star finder of claim 3 including a linear time scale on the first side of the holder and a linear date scale on the map whereby the finder may be set to portray the sky visible at the time and date of observation.

5. The star finder of claim 4 in which said star map includes the sky from 60° north declination to 60° south declination.

6. The star finder of claim 3 including a rotatable map of the circumpolar stars mounted on the other side of the holder above the star map, the circumpolar map being provided with a date scale adapted to be aligned with the date scale on the map with the last mentioned date scale aligned with the time scale to portray the position of the circumpolar stars at the time and date of observation.

7. The star finder of claim 3 in which said templates and the altitude and azimuth and horizon delineators carried thereon are adapted to show the altitude and azimuth of a star at the approximate latitude of the observer, said templates being removable and replaceable with templates carrying indicating means and horizon delineators corresponding to other approximate latitudes.

8. The star finder of claim 1 in which said star map includes the sky from 60° north to 60° south declination.

9. The star finder of claim 8 in which said indicating means and said horizon delineator are carried on the template and in which said template is adapted to show the altitude and azimuth of a star at the approximate latitude of the observer, said template being removable and replaceable with templates carrying indicating means and horizon delineators corresponding to other latitudes.

10. The star finder of claim 3 in which said indicating means and said horizon delineator are carried on the template and are adapted to show the altitude and azimuth of a star at the approximate latitude of the observer in one hemisphere, said template being invertible on the holder to show the altitude and azimuth of a star at the approximate latitude of the observer in the other hemisphere.

HAROLD B. CURTIS.

REFERENCES CITED

The following references are of record in the file of this patent:

UNITED STATES PATENTS

| Number | Name | Date |
|---|---|---|
| 247,289 | Bailey | Sept. 20, 1881 |
| 515,195 | Cowell | Feb. 20, 1894 |
| 1,873,595 | Johnson | Aug. 23, 1932 |